UNITED STATES PATENT OFFICE.

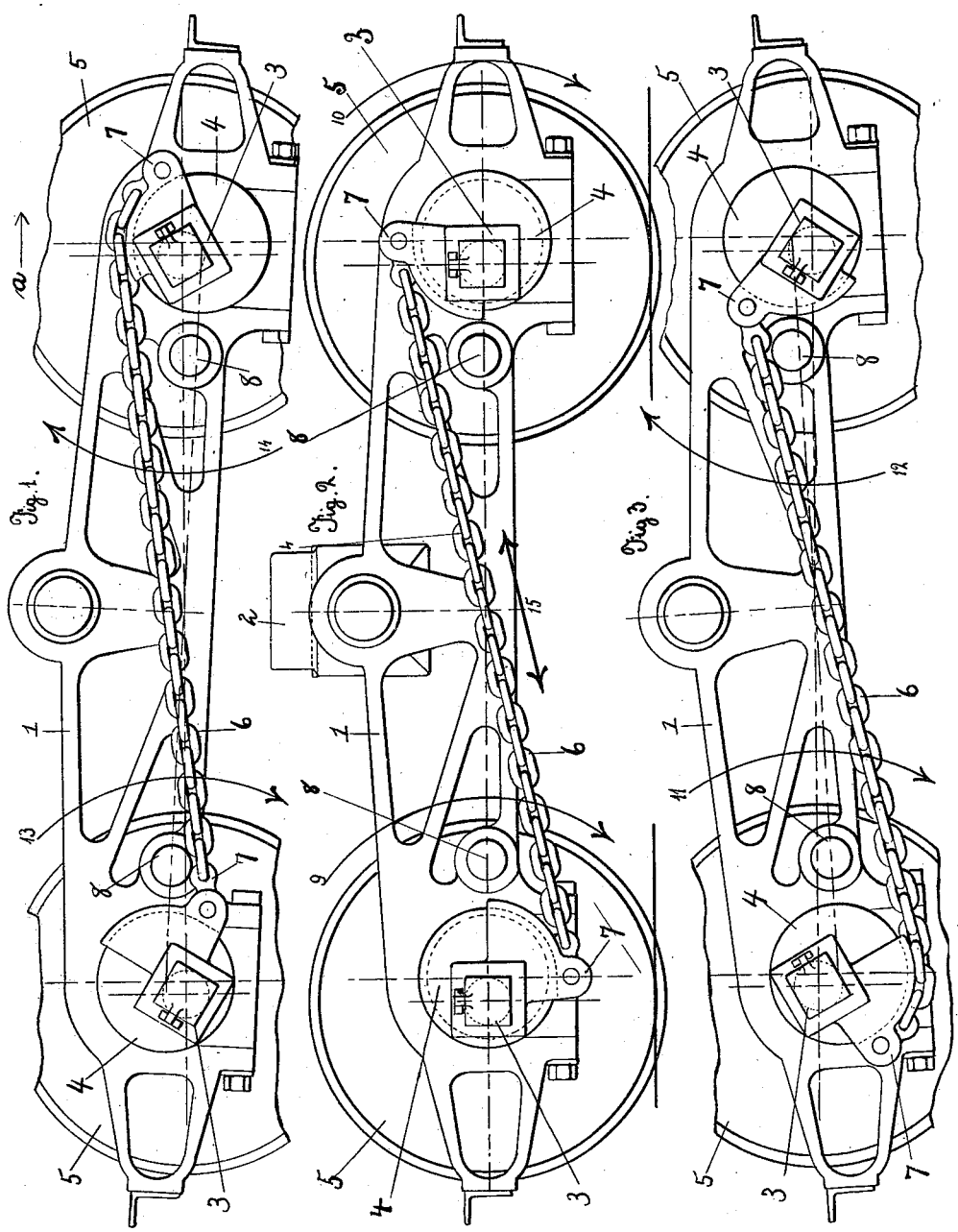

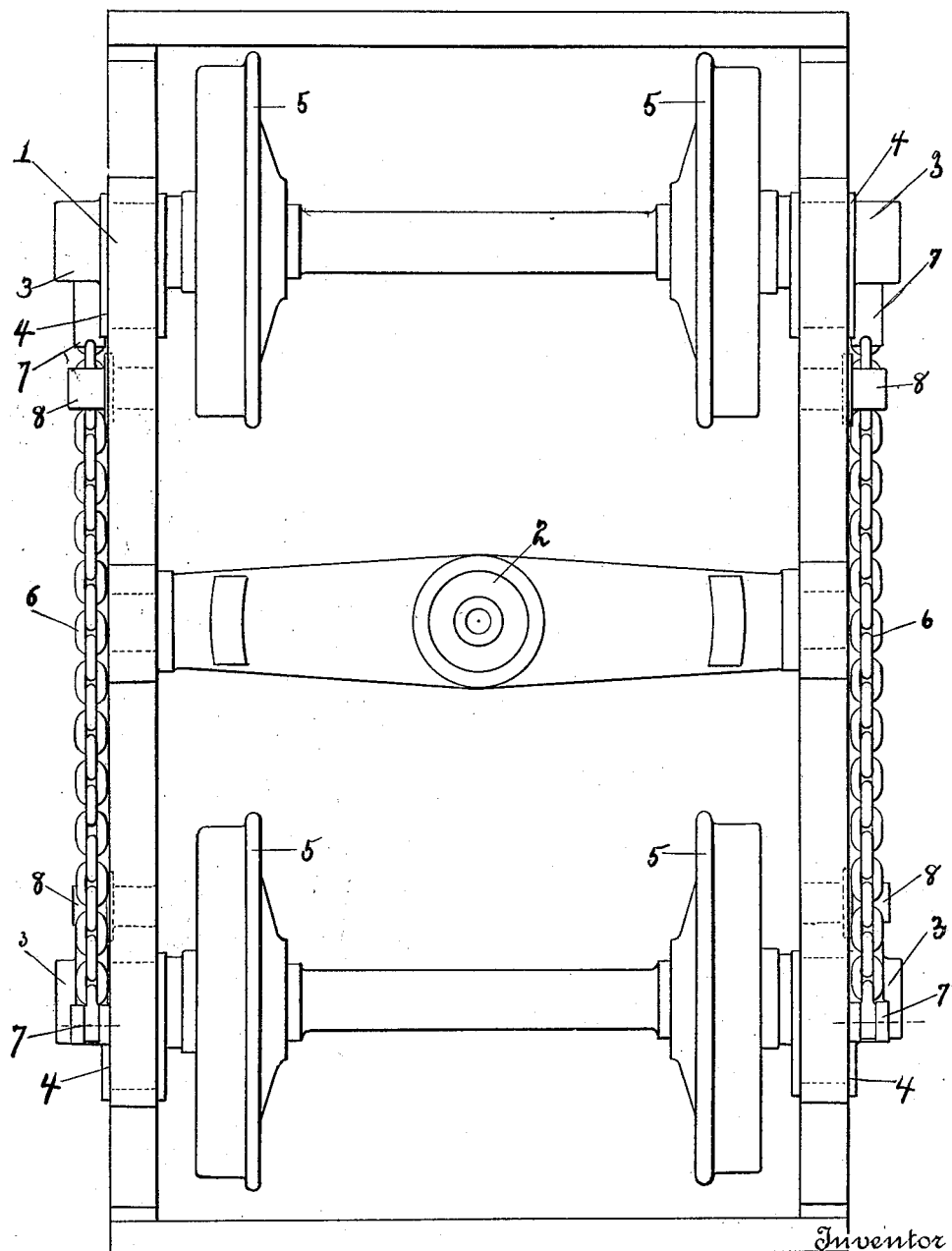

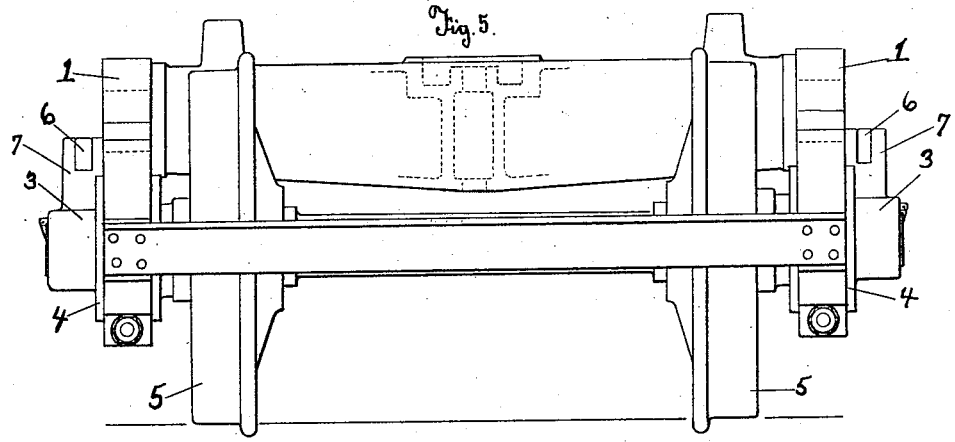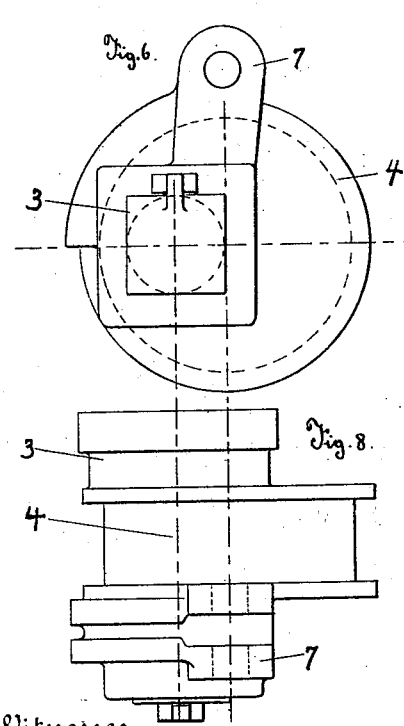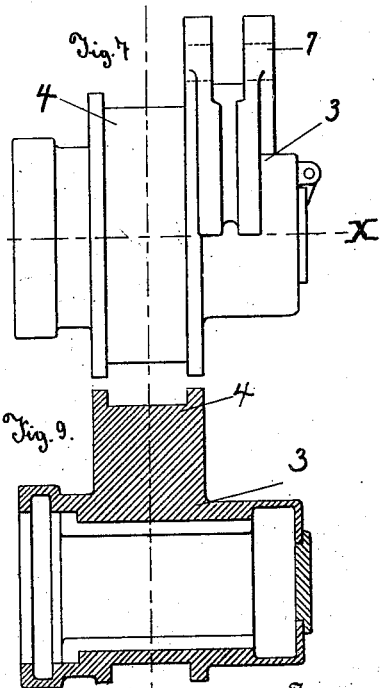

GIUSEPPE BRAVI, OF LANSDALE, PENNSYLVANIA, ASSIGNOR OF ONE-HALF TO SANTE T. ALLEVA, OF NORRISTOWN, PENNSYLVANIA.

SPRINGLESS SUSPENSION FOR VEHICLES.

1,142,395.  Specification of Letters Patent.  Patented June 8, 1915.

Application filed June 4, 1914. Serial No. 842,872.

*To all whom it may concern:*

Be it known that I, GIUSEPPE BRAVI, a subject of the King of Italy, residing at Lansdale, in the county of Montgomery and State of Pennsylvania, have invented new and useful Improvements in Springless Suspension for Vehicles, of which the following is a specification.

My invention relates to new and useful improvements in springless suspensions for vehicles, and has for its object to so construct such a device as to overcome the necessity for the use of springs and other such devices to take up the shock incidental to a vehicle traveling over rails or road bed, and to keep the vehicle upon a level, regardless of the up and down movement of the wheels in riding over unevennesses or other obstructions.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawings forming a part of this specification, in which—

Figure 1, is a side elevation of a truck to which my invention is applied showing the oscillating journal boxes in the position they assume, the front end of the truck having been slightly lowered and the rear end correspondingly elevated. Fig. 2, is a similar view showing the position assumed by the oscillating journal boxes, when the truck is in its normally horizontal position. Fig. 3, is a similar view showing the oscillating journal boxes in the position they assume when the rear end of the truck is lowered and the forward end elevated. Fig. 4, is a plan view of Fig. 2. Fig. 5, is an end view of Fig. 4. Fig. 6, is an enlarged detail view of one of the oscillating journal boxes. Fig. 7, is a side view of Fig. 6. Fig. 8, is a plan view of Fig. 6; and Fig. 9, is a section at the line $x$ of Fig. 7.

It is to be understood that my invention is applicable to various forms of trucks, and the running gear of other vehicles, and that it is not my intention to limit myself to the details of construction here shown as these are only to illustrate the principle of my invention as applied to one form of truck.

In carrying out my invention as here embodied 1 represents a truck frame, which is hinged or pivoted to the bolster 2 upon which latter a portion of the vehicle rests, as for instance, one end of an ordinary railway car, thus giving the truck frame a free swinging or see-saw movement as will be readily understood.

Within the ends of the truck frame are set the journal boxes 3 having their central portions in the form of eccentrics 4 which are so fitted in their bearings as to have a free rotary or oscillating movement, which movement is limited as hereinafter set forth.

The journal boxes have the axle journals of each pair of wheels 5 journaled therein in any well known or convenient manner so that when the journal boxes are stationary, the truck will operate in all respects as does the ordinary truck.

6 represents a chain which is attached to the lug 7 on each of the journal boxes. Each chain comprises one forward and one rear journal box as clearly shown in Figs. 1, 2, and 3, thus tying each pair of boxes together, so that when one is moved, the other will be pulled a corresponding distance, it being understood that cables may be used instead of chains.

8 are stops in the form of lugs set in the truck frame and projecting beyond the sides thereof in the path of the movement of the lugs 7 upon the oscillating journal boxes, so that the movement of these journal boxes will be limited by the contact of the lugs and stops.

When the truck is at rest the oscillating journal boxes will assume the position shown in Fig. 2, but when the truck is traveling in the direction of the arrow $a$, any obstructions met by the forward wheel will tend to arrest its motion, when the momentum of the vehicle and truck will exert a forward thrust upon the bearings and this thrust will revolve the forward journal boxes and through the chains cause the rear journal boxes to oscillate through a like number of degrees of the arc, thus raising the rear end of the truck and lowering the forward end thereof in exact proportion to the rise which has been given the forward pair of wheels by the obstructions or unevennesses it has met in the road bed. This will absorb the vertical motion which would have been otherwise transmitted to the vehicle resting upon the truck, avoiding the vibration and jar which would otherwise be transmitted to said vehicle. The same will happen when the rear pair of wheels come in contact with any obstruction or unevennesses in the road bed, but of course in a reverse direction as shown in Fig. 3.

From the foregoing description it will be seen that as each pair of wheels rises and falls in passing over unevennesses or are retarded by obstructions the momentum of the vehicle oscillates the journal boxes and as they are set eccentric relative to the wheel journals, the frame will be oscillated or seesawed upon its pivot to a degree equivalent to the elevation of either pair of wheels and thus leave the body of the vehicle in its normal position, avoiding the transmission of shock and vibration to said vehicle.

Of course I do not wish to be limited to the exact details of construction as here shown, as these may be varied within the limits of the appended claims without departing from the spirit of my invention.

Having thus fully described my invention, what I claim as new and useful, is—

1. A springless suspension for vehicles consisting of a hinged truck frame, oscillating journal boxes fitted in said frame, two pair of wheels, each pair having a common axle, the journals of said wheels projecting into said journal boxes off the center of the oscillation of said boxes, stops carried by the truck frame for limiting the oscillation of the journal boxes and means for connecting the journal boxes in pairs for causing said journal boxes to oscillate in unison.

2. A springless suspension for vehicles comprising two pair of journal boxes in which the wheel journals are eccentrically set and means for oscillating the pairs of journal boxes in unison reversely.

3. A springless suspension for vehicles comprising two pair of journal boxes in which the wheel journals are eccentrically set, and means for oscillating the pairs of journal boxes in unison, whereby one pair of said journal boxes is lowered, while the other pair is raised for absorbing shocks.

4. A springless suspension for vehicles consisting of a truck frame, two pair of journal boxes fitted in said truck frame, so as to oscillate therein, axles eccentrically journaled in said boxes, wheels mounted on said axles, means connecting each pair of journal boxes on the same side of the truck for oscillating the pairs of journal boxes in unison.

5. A springless suspension for vehicles consisting of a truck frame, two pair of journal boxes fitted in said truck frame, so as to oscillate therein, axles eccentrically journaled in said boxes, wheels mounted on said axles, means connecting each pair of journal boxes on the same side of the truck for oscillating the pairs of journal boxes in unison, and means for limiting the oscillation of the journal boxes.

In testimony whereof, I have hereunto affixed my signature in the presence of two subscribing witnesses.

GIUSEPPE BRAVI.

Witnesses:
W. HAMILTON ROSE,
S. T. ALLEVA.

Copies of this patent may be obtained for five cents each, by addressing the "Commissioner of Patents, Washington, D. C."